United States Patent
Wang

(10) Patent No.: US 9,377,926 B2
(45) Date of Patent: Jun. 28, 2016

(54) METHOD AND APPARATUS FOR GESTURE OPERATION ON ADDRESS BAR AND TOUCH SCREEN TERMINAL

(71) Applicant: TENCENT TECHNOLOGY (SHENZHEN) COMPANY LIMITED, Guangdong (CN)

(72) Inventor: Wanxin Wang, Guangdong (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 0 days.

(21) Appl. No.: 14/374,701

(22) PCT Filed: Dec. 12, 2013

(86) PCT No.: PCT/CN2013/089276
§ 371 (c)(1),
(2) Date: Jul. 25, 2014

(87) PCT Pub. No.: WO2014/173142
PCT Pub. Date: Oct. 30, 2014

(65) Prior Publication Data
US 2015/0261388 A1     Sep. 17, 2015

(30) Foreign Application Priority Data
Apr. 27, 2013  (CN) .......................... 2013 1 0152618

(51) Int. Cl.
*G06F 3/048* (2013.01)
*G06F 3/0481* (2013.01)
*G06F 3/0488* (2013.01)
*G06F 3/0482* (2013.01)
*G06F 3/0484* (2013.01)
*G06F 3/00* (2006.01)

(52) U.S. Cl.
CPC ............ *G06F 3/0481* (2013.01); *G06F 3/0482* (2013.01); *G06F 3/0484* (2013.01); *G06F 3/0488* (2013.01)

(58) Field of Classification Search
CPC ... G06F 3/0481; G06F 9/4443; G06F 3/0482; G06F 3/04847; G06Q 10/10
See application file for complete search history.

(56) References Cited

U.S. PATENT DOCUMENTS 8,381,133 B2 * 2/2013 Iwema et al. ................. 715/845
2005/0278647 A1 * 12/2005 Leavitt et al. ................. 715/765
(Continued)

FOREIGN PATENT DOCUMENTS

EP        2533146 A2      12/2012

OTHER PUBLICATIONS

International Search Report dated Mar. 20, 2014 in related PCT Application No. PCT/CN2013/089276, 6 pages.

*Primary Examiner* — Nicholas Augustine
(74) *Attorney, Agent, or Firm* — Hauptman Ham, LLP

(57) ABSTRACT

There is provided a method and apparatus for gesture operation on address bar, a touch screen terminal and a computer readable storage medium, the method including: detecting an operation gesture acting on a current interface which is a user interface having an address bar; determining whether the operation gesture is matched with a preset address bar operation gesture or not when the operation gesture is detected; and generating a box at the current interface, displaying address bar operation option(s) associated with the preset address bar operation gesture on the box, and performing an address bar operation associated with an address bar operation option selected by a user, if the operation gesture is matched with the preset address bar operation gesture. Quick and convenient operation on an address bar is realized.

9 Claims, 4 Drawing Sheets

(56) References Cited

U.S. PATENT DOCUMENTS

| | | | |
|---|---|---|---|
| 2008/0036743 A1* | 2/2008 | Westerman et al. | 345/173 |
| 2008/0168384 A1* | 7/2008 | Platzer et al. | 715/784 |
| 2011/0154268 A1* | 6/2011 | Trent et al. | 715/863 |
| 2012/0317503 A1* | 12/2012 | Noh et al. | 715/760 |

* cited by examiner

METHOD AND APPARATUS FOR GESTURE OPERATION ON ADDRESS BAR AND TOUCH SCREEN TERMINAL

CROSS-REFERENCES TO RELATED APPLICATIONS

The present application is National Phase of International Application Number PCT/CN2013/089276 filed Dec. 12, 2013 and claims the priority of Chinese patent Application No. CN 201310152618.5 filed Apr. 27, 2013.

TECHNICAL FIELD

The present disclosure belongs to the field of touch screen terminal, and particularly relates to a method and apparatus for gesture operation on an address bar, a touch screen terminal and a computer readable storage medium.

BACKGROUND

An address bar is one of the important approaches for man-machine interaction in a touch screen terminal. A user can input corresponding characters such as a page address, a folder or file path and the like in an address bar to open a web page or a local page, or to jump to a folder or file page corresponding to a corresponding directory. Presently, shortcut operations on the address bar of the touch screen terminal are only limited to simple operations on the characters in the address bar such as copy, paste and the like. For other operations such as saving as a bookmark, searching, loading a web page and the like, it is needed to operate at other positions on the page where the address bar is located. For example, when the address bar is located at a browser page, the related operations such as saving as a bookmark, searching, loading a web page and the like are all within a toolbar at the bottom of the browser, and thus it is not quick and convenient for a user to use them.

SUMMARY OF THE DISCLOSURE

Embodiments of the present disclosure provides a method and apparatus for gesture operation on address bar, a touch screen terminal and a computer readable storage medium, aiming to resolve the problem that existing methods for operation on address bar is not quick and convenient.

In one aspect, there is provided a method for gesture operation on an address bar, comprising: detecting an operation gesture acting on a current interface which is a user interface (UI) having an address bar; determining whether the operation gesture is matched with a preset address bar operation gesture or not when the operation gesture is detected; and generating a box at the current interface, displaying address bar operation option(s) associated with the preset address bar operation gesture on the box, and performing an address bar operation associated with an address bar operation option selected by a user, if the operation gesture is matched with the preset address bar operation gesture.

In another aspect, there is provided an apparatus for gesture operation on an address bar, comprising: a gesture detection unit configured to detect an operation gesture acting on a current interface which is a user interface having an address bar; a gesture determination unit configured to determine whether the operation gesture is matched with a preset address bar operation gesture or not when the operation gesture is detected; and an operation performing unit configured to generate a box at the current interface, to display address bar operation option(s) associated with the preset address bar operation gesture on the box, and to perform an address bar operation associated with an address bar operation option selected by a user, if the operation gesture is matched with the preset address bar operation gesture.

In a further aspect, there is provided a touch screen terminal comprising the apparatus for gesture operation on an address bar as described above.

In a still further aspect, there is provided a computer readable storage medium having stored thereon a computer program containing a program code, which, when executed on a computing device, performs respective steps of the method for gesture operation on an address bar as described above.

According to embodiments of the present disclosure, quick and convenient operations on an address bar are realized.

DETAILED DESCRIPTION

In order to make the object, technical schemes and advantages of the present disclosure more clear, a further detailed description of the present disclosure will be made in conjunction with attached drawings and embodiments below. It is appreciated that specific embodiments described herein are only used to explain but not to limit the present disclosure.

In an embodiment of the present disclosure, an operation gesture acting on a current interface which is a UI (User Interface) having an address bar is detected; whether the operation gesture is matched with a preset address bar operation gesture or not is determined when the operation gesture is detected; and if the operation gesture is matched with the preset address bar operation gesture, a box is generated at the current interface, address bar operation option(s) associated with the preset address bar operation gesture is displayed on the box, and an address bar operation associated with an address bar operation option selected by a user is performed.

The detailed description of the implementation of the present disclosure is made in conjunction with specific embodiments below.

(First Embodiment)

Figure 1:
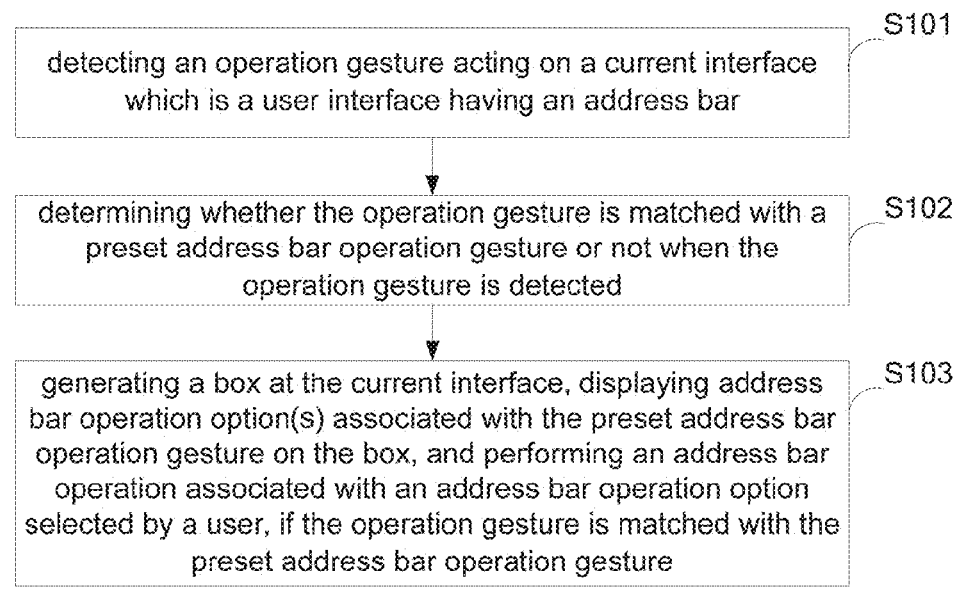
FIG. 1 is a flowchart of implementation of a method for gesture operation on an address bar provided in one embodiment of the present disclosure.

FIG. 1 shows a flowchart of the implementation of a method for gesture operation on an address bar provided in one embodiment of the present disclosure. The method can for example be applied to any electronic device having a UI containing an address bar. Preferably, the electronic device can be a terminal with a touch screen (also referred to as touch screen terminal). The detailed description thereof is as follows.

At a step S101, an operation gesture acting on a current interface which is a UI having an address bar is detected.

In the present embodiment, the current interface can include a browser page, a folder page and any other page containing an address bar. The address bar for different pages can have different address bar operations. For example, the address bar of a browser page includes address bar operations such as saving as a bookmark, searching, loading a web page and the like. The operation gesture can be for example a touch operation by a user through a touch screen and is used for triggering and performing an address bar operation of the current interface. The operation gesture includes, but is not limited to, sliding by double fingers, pressing and clicking, sliding by three fingers and so on. A touch screen device can detect an operation gesture acting on the current interface.

As an optional additional step, it is also possible to set an address bar operation gesture corresponding to the address bar operation as the preset address bar operation gesture. This step can be performed for example before the step of detecting the operation gesture acting on a current interface.

Specifically, it is possible to preset multiple address bar operations corresponding to one address bar operation gesture. It is also possible to preset one address bar operation corresponding to one address bar operation gesture. In this way, there may be two cases when a user operates on an address bar. In one case, one address bar operation gesture is corresponding to multiple address bar operations, and at this point, multiple address bar operation options associated with the multiple address bar operations are displayed so as for the user to select a certain address bar operation to be performed. In the other case, one address bar operation is corresponding to one address bar operation gesture, and at this time, the address bar operation corresponding to the user's gesture may be performed directly, or the one address bar operation option corresponding to the one address bar operation may be displayed and selected by the user to perform the one address bar operation. It is noted that the corresponding address bar operation option may be or may not be displayed in the case of performing the address bar operation directly.

At a step S102, it is determined whether the operation gesture is matched with a preset address bar operation gesture or not when the operation gesture is detected.

In the present embodiment, the preset address bar operation gesture can be a preset user operation action instruction associated with the performance of the address bar operation. The preset address bar operation gesture includes, but is not limited to, sliding by double fingers, pressing and clicking, sliding by three fingers and so on. The preset gestures may be corresponding to the address bar operations in a manner of one-to-one or one-to-many. Specifically, it can be set for example that the sliding by double fingers is corresponding to the operation of saving as a bookmark for the address bar of the browser page, the pressing and clicking is corresponding to the operation of searching, the sliding by three fingers is corresponding to the operation of loading a web page, and a narrowing gesture is corresponding to all the address bar operations.

At a step S103, if the operation gesture is matched with the preset address bar operation gesture, a box is generated at the current interface, address bar operation option(s) associated with the preset address bar operation gesture is displayed on the box, and an address bar operation associated with an address bar operation option selected by a user is performed.

In the present embodiment, the step S103 can include two cases specifically as follows.

In the first case, if the preset address bar operation gesture is corresponding to multiple address bar operations, a box is generated at the current interface, address bar operation options corresponding to the multiple address bar operations respectively are displayed on the box, and an address bar operation associated with an address bar operation option selected by a user is performed.

Specifically, the box is used for presenting options associated with the address bar operations and includes, but is not limited to, a window, a menu or the like. Since the address bars of different pages correspond to different numbers of address bar operations, the box presents different numbers of options depending on application situations. If the preset address bar operation gesture is corresponding to multiple address bar operations, then a box (for example, one box) is generated at the current interface, the address bar operation option corresponding to every address bar operation is displayed on the box, and the address bar operation associated with an address bar operation option selected by a user among the displayed address bar operation options is performed. Specifically, taking the configuration of the browser page as described above as an example, when a narrowing gesture of the user is detected, since the preset address bar operation gesture matched with the gesture is corresponding to multiple address bar operations, one menu displaying the multiple address bar operations can be generated, so that the user can select an address bar operation to be performed depending on specific requirements. Here, the selection operation of the user may be for example clicking on the corresponding operation option or the like.

In the second case, if the preset address bar operation gesture is corresponding to one address bar operation, a box can be generated at the current interface, the address bar operation option corresponding to the one address bar operation can be displayed on the box, and the address bar operation associated with the address bar operation option selected by a user can be performed. In this way, although the preset address bar operation gesture is corresponding to only one address bar operation, the user is still required to select the corresponding address bar operation option so that the corresponding address bar operation can be preformed. Such operating way is similar with the case that one address bar operation gesture is corresponding to multiple address bar operations.

Another optional scheme in the second case is that the one address bar operation corresponding to the preset address bar operation gesture can be performed directly without any selection operation of the user if the preset address bar operation gesture is corresponding to the one address bar operation.

Specifically, if the user sets a preset gesture corresponding to a single address bar operation, after the operation gesture matched with the preset gesture, a box may be invoked to display the address bar operation option for the user to select, or the address bar operation corresponding to the preset gesture may be performed directly. The corresponding address bar operation option may be or may not be displayed in the case of performing the address bar operation directly. Taking the setting of the browser page as described above as an example, if a gesture of sliding by three fingers by user is detected, since the gesture is the same as the preset address bar operation gesture corresponding to the operation of loading a web page, the browser can perform loading the web page corresponding to the website address directly.

For example, an applicable scenario of the present embodiment is described by taking the address bar of the browser of a touch screen phone as a specific target object as follows.

Figure 2:
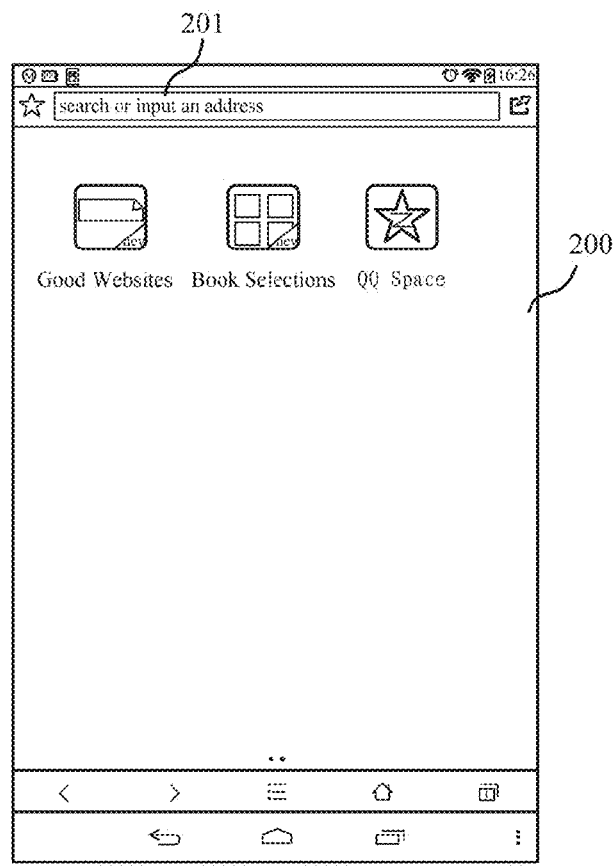
FIG. 2 is a schematic diagram of a browser page provided in one embodiment of the present disclosure.
Figure 3:
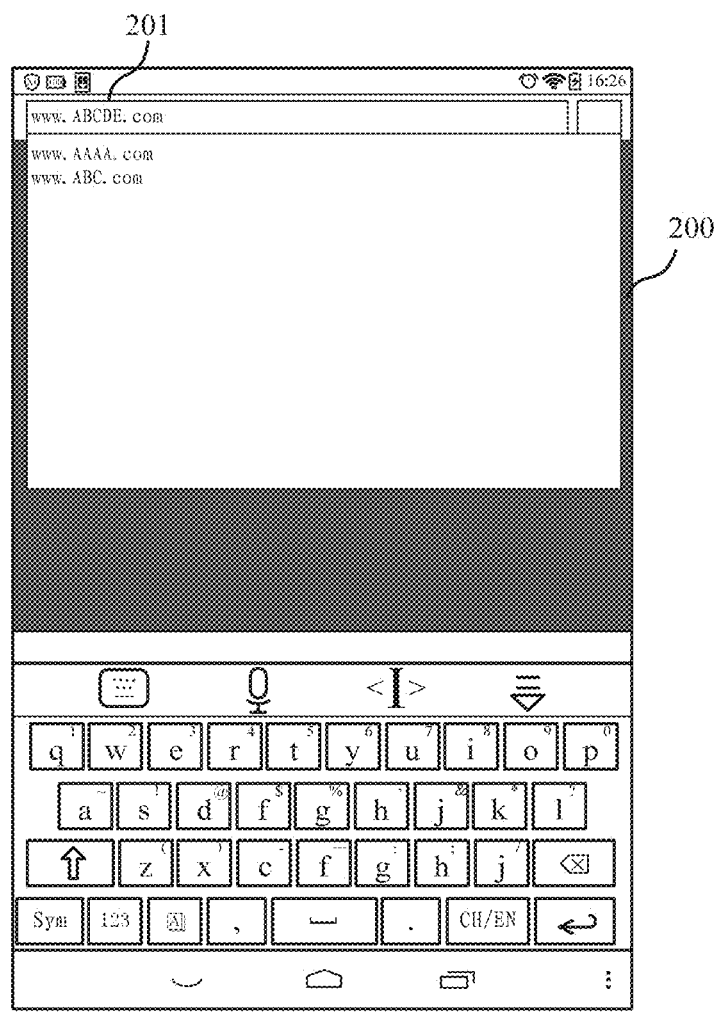
FIG. 3 is a schematic diagram of the input state of a browser address bar provided in one embodiment of the present disclosure.
Figure 4:
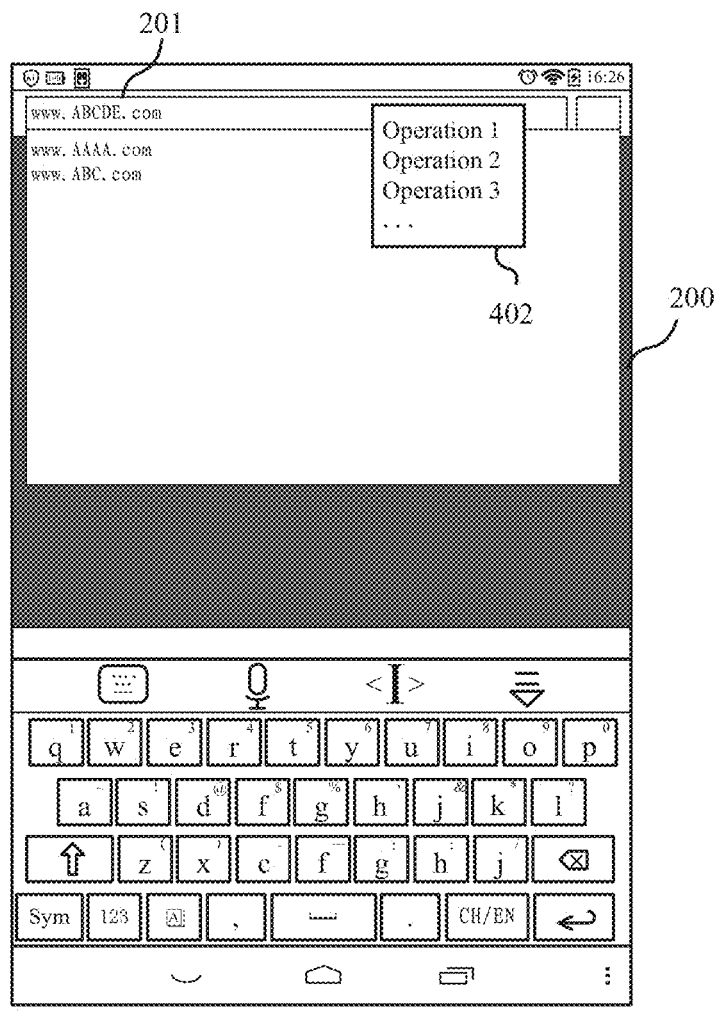
FIG. 4 is a schematic diagram of the address bar operations of the browser provided in one embodiment of the present disclosure.

As shown in FIG. 2, a browser page 200 (an example of UI) of the touch screen phone is displayed, a user can click the address bar 201 therein, and input content such as a website address, a email address or the like in the address bar 201. Then, as shown in FIG. 3, when the input is completed and other address bar operations are required to be performed on the address bar 201, an operation gesture can be performed by the user at the address bar 201. If the operation gesture is matched with a preset gesture and the preset gesture is corresponding to multiple address bar operations of the browser, as shown in FIG. 4, the browser generates a menu 402 (an example of the box) near the address bar and presents options corresponding to the multiple address bar operations, such as options of saving as a bookmark, searching and loading a web page, or the like, on the menu 402. In FIG. 4, the options are schematically shown as operation 1, operation 2 and operation 3. When the user selects a corresponding option for example by clicking or the like, the address bar operation associated with the selected option is performed.

In the present embodiment, invoking an address bar operation by an operation gesture can be achieved, thus quick and convenient operation on an address bar is realized.

(Second Embodiment)

The second embodiment of the present disclosure provides another specific application scenario of the method for gesture operation on address bar. The detailed description thereof is as follows.

As shown in FIG. 2, a browser page 200 of the touch screen phone is displayed, a user can click the address bar 201 therein, and input content such as a website address, a email address or the like in the address bar 201. Then, as shown in FIG. 3, when the input is completed and other address bar operations are required to be performed on the address bar 201, an operation gesture can be performed by the user at the address bar 201. If the operation gesture is matched with the preset gesture and the preset gesture is corresponding to one address bar operation of the browser, for example any one of operations of saving as a bookmark, searching, loading a web page and so on, the address bar operation can be performed directly, and at this point, the operation option corresponding to the address bar operation may be or may not be displayed. Alternatively, in such a case, it is also possible to present the option corresponding to the one address bar operation on the menu for the user to select, and when the option is selected by the user, the address bar operation associated with the option is performed.

(Third Embodiment)

Figure 5:
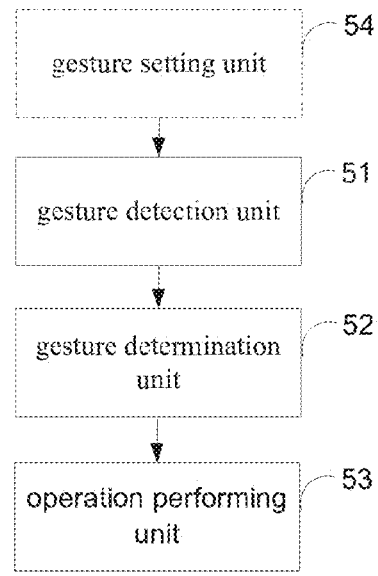
FIG. 5 is a structural schematic diagram of an apparatus for gesture operation on an address bar provided in another embodiment of the present disclosure.

FIG. 5 is a structural schematic diagram of an apparatus for gesture operation on an address bar provided in another embodiment of the present disclosure, in which only parts related to the embodiment of the present disclosure are shown for the convenience of description. In the present embodiment, the apparatus for gesture operation on an address bar includes a gesture detection unit 51, a gesture determination unit 52, an operation performing unit 53 and a gesture setting unit 54. It is noted that the gesture setting unit 54 is an optional unit rather than an essential unit, and thus the block for the gesture setting unit 54 is shown by a broken line in FIG. 5.

The gesture detection unit 51 is configured to detect an operation gesture acting on a current interface which is a UI having an address bar.

The gesture determination unit 52 is configured to determine whether the operation gesture is matched with a preset address bar operation gesture or not when the operation gesture is detected.

The operation performing unit 53 is configured to generate a box at the current interface, to display address bar operation option(s) associated with the preset address bar operation gesture on the box, and to perform an address bar operation associated with an address bar operation option selected by a user, if the operation gesture is matched with the preset address bar operation gesture.

Preferably, if the preset address bar operation gesture is corresponding to one or more address bar operations, the operation performing unit may be configured to generate a box at the current interface, to display address bar operation options corresponding to the one or more address bar operations respectively on the box, and to perform an address bar operation associated with an address bar operation option selected by a user.

Preferably, if the preset address bar operation gesture associates with one address bar operation, the operation performing unit may be configured to perform the one address bar operation corresponding to the preset address bar operation gesture directly. As described above, when the one address bar operation corresponding to the preset address bar operation gesture is performed directly, an address bar operation option associated with the preset address bar operation gesture may be or may not be displayed on one box.

Preferably, the apparatus may further includes a gesture setting unit 54 configured to set an address bar operation gesture corresponding to the address bar operation as the preset address bar operation gesture.

Preferably, the box includes a window, a menu or the like.

The corresponding method embodiments as described above can be applied to the specific description of the apparatus for gesture operation on an address bar provided in the embodiment of the present disclosure, the detail of which refers to the description of the above method embodiments and will no longer be given here for avoiding redundancy.

It is noted that, in the above apparatus embodiment, respective units included are divided in accordance with only functional logic, but are not limited to the above division. It suffices that the respective units can realize corresponding functions. In addition, the specific names of the respective functional units are only for the convenience of distinguishing one from another, but are not used to limit the protection scope of the present disclosure.

Furthermore, it can be understood by those ordinary skilled in the art that all or part of steps for implementing the methods of respective embodiments as described above may be completed by the related hardware instructed by a program which may be stored in a computer readable storage medium such as a ROM/RAM, a magnetic disk, a compact disc or the like. For example, the present disclosure may be implemented as a computer readable storage medium having stored thereon a computer program containing a program code, which, when executed on a computing device, performs respective steps of the method for gesture operation on an address bar as described above.

Figure 6:
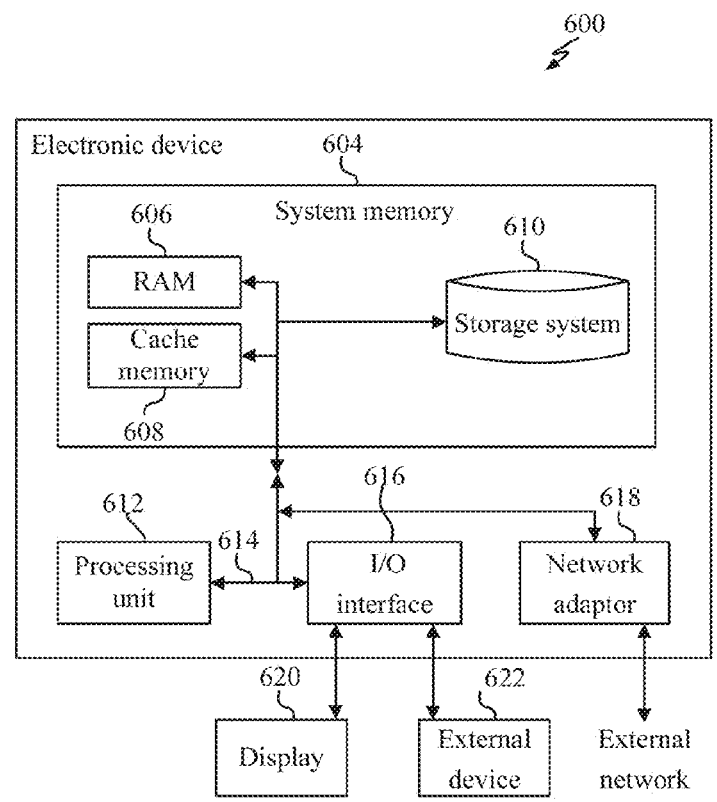
FIG. 6 is a structural schematic diagram showing an example electronic device which can be used to implement respective embodiments of the present disclosure.

FIG. 6 is a structural schematic diagram showing an example electronic device which can be used to implement respective embodiments of the present disclosure.

The electronic device 600 shown in FIG. 6 is only an example and is not limiting of the functionality and the scope of use of embodiments of the disclosure. As shown in FIG. 6, the electronic device 600 may be in a form of a general purpose computing device. Components of the electronic device 600 may include, but are not limited to, one or more processors or processing units 612, a system memory 604, an I/O interface 616, a network adapter 618, a display 620 and a bus 614 that couples various components, and may be connected to an external device 622.

The bus 614 represents one or more of several types of bus structures. For example, such bus structures include, but are not limited to, Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and so on.

The electronic device 600 typically includes a variety of computer system readable media. Such medium may be any readable media that is accessible by the electronic device 600, and it includes both volatile and non-volatile media, and both removable and non-removable media.

The system memory 604 can include readable media in the form of volatile memory, such as random access memory (RAM) 606 and/or cache memory 608. The electronic device 600 may further include other removable/non-removable, volatile/non-volatile storage media. For example, the storage system 610 (typically called a "hard drive") can be provided for reading from and writing to a non-removable, non-volatile magnetic media. Although not shown, a magnetic disk drive for reading from and writing to a removable, non-volatile magnetic disk (e.g., a "U disk"), and an optical disk drive for reading from or writing to a removable, non-volatile optical disk such as a CD-ROM, DVD-ROM or other optical media can be provided. In such instances, each drive can be connected to the bus 614 by one or more data medium interfaces.

The system memory 604 may include at least one program product having a set (for example, at least one) of program modules which may be stored in the storage system 610. The program module contains a computer executable program instruction. Such program modules are configured to perform functions of respective embodiments of the present disclosure by the processing units 612 executing the program instruction therein. Such program modules include, but are not limited to, an operating system, one or more application programs, other program modules, and program data. Each of these examples of program modules or some combination thereof may include an implementation of a networking environment.

The electronic device 600 may also communicate with one or more external devices 622 such as a keyboard, a mouse, the display 620, etc.; and one or more devices that enable a user to interact with the electronic device 600. Such communication can occur via the Input/Output (I/O) interface 616. Further, the electronic device 600 can also communicate with one or more networks such as a local area network (LAN), a general wide area network (WAN), and/or a public network (e.g., the Internet) via the network adapter 618 such as a network card, modem, etc. As shown in FIG. 6, the I/O interface 616 and the network adapter 618 communicates with the other modules of the electronic device 600 via the bus 614. It should be understood that although not shown, other hardware and/or software modules can be used in conjunction with the electronic device 600. Such other hardware and/or software modules include, but are not limited to: microcode, device drivers, redundant processing units, external disk drive arrays, RAID systems, tape drives, and data archival storage systems, etc.

Respective units or steps in respective embodiments of the present disclosure may all be implemented by executing program modules having computer program instructions in the electronic device 600.

The described above is only preferable embodiments of the present disclosure and is not intended to limit the present disclosure. Any modification, equivalent replacement, improvement, etc made within the spirit and principle of the present disclosure should all be contained within the protection scope of the present disclosure.

What is claimed is:

1. A computer-implemented method for gesture operation on an address bar, said method comprising:
    detecting an operation gesture acting on a current interface, which is a user interface having an address bar, when an input of a content in the address bar is completed;
    determining whether the operation gesture is matched with a preset address bar operation gesture or not when the operation gesture is detected; and
    when the operation gesture is matched with the preset address bar operation gesture,
        generating a box at the current interface,
        displaying address bar operation option or options associated with the preset address bar operation gesture on the box, and
        performing an address bar operation associated with an address bar operation option selected by a user,
    wherein
    the preset address bar operation gesture includes a sliding by two fingers, a pressing and clicking, and a sliding by three fingers,
    the sliding by two fingers corresponds to an address bar operation of saving as a bookmark for the address bar,
    the pressing and clicking corresponds to an address bar operation of searching,
    the sliding by three fingers corresponds to an address bar operation of loading a web page, and
    a narrowing gesture corresponds to all the address bar operations.

2. The computer-implemented method according to claim 1, wherein when the preset address bar operation gesture is corresponding to one or more address bar operations,
    the displaying the address bar operation option or options associated with the preset address bar operation gesture on the box comprises:
        displaying the address bar operation option or options corresponding to the one or more address bar operations respectively on the box.

3. The computer-implemented method according to claim 1, wherein when the preset address bar operation gesture is corresponding to one address bar operation, the one address bar operation corresponding to the preset address bar operation gesture is performed directly.

4. The computer-implemented method according to claim 1, further comprising:
    setting an address bar operation gesture corresponding to the address bar operation as the preset address bar operation gesture.

5. A computer program product for gesture operation on an address bar, the computer program product comprising a non-transitory computer readable medium having instructions tangibly embodied thereon, said instructions, when executed by a processor, causing the processor to perform a method comprising:
    detecting an operation gesture acting on a current interface which is a user interface having an address bar when an input of a content in the address bar is completed;
    determining whether the operation gesture is matched with a preset address bar operation gesture or not when the operation gesture is detected; and
    when the operation gesture is matched with the preset address bar operation gesture,
        generating a box at the current interface,
        displaying address bar operation option or options associated with the preset address bar operation gesture on the box, and performing an address bar operation associated with an address bar operation option selected by a user,
wherein
the preset address bar operation gesture includes a sliding by two fingers, a pressing and clicking, and a sliding by three fingers,
the sliding by two fingers corresponds to an address bar operation of saving as a bookmark for the address bar,
the pressing and clicking corresponds to an address bar operation of searching,
the sliding by three fingers corresponds to an address bar operation of loading a web page, and
a narrowing gesture corresponds to all the address bar operations.

6. The computer program product according to claim 5, wherein when the preset address bar operation gesture is corresponding to one or more address bar operations,
the displaying the address bar operation option or options associated with the preset address bar operation gesture on the box comprises:
displaying the address bar operation option or options corresponding to the one or more address bar operations respectively on the box.

7. The computer program product according to claim 5, wherein when the preset address bar operation gesture is corresponding to one address bar operation,
the one address bar operation corresponding to the preset address bar operation gesture is performed directly.

8. The computer program product according to claim 5, said method further comprising:
setting an address bar operation gesture corresponding to the address bar operation as the preset address bar operation gesture.

9. A touch screen terminal, comprising an apparatus for gesture operation on an address bar, the apparatus comprising:
a gesture detection unit configured to detect an operation gesture acting on a current interface, which is a user interface having an address bar, when an input of a content in the address bar is completed;
a gesture determination unit configured to determine whether the operation gesture is matched with a preset address bar operation gesture or not when the operation gesture is detected; and
an operation performing unit configured, when the operation gesture is matched with the preset address bar operation gesture,
to generate a box at the current interface,
to display address bar operation option or options associated with the preset address bar operation gesture on the box, and
to perform an address bar operation associated with an address bar operation option selected by a user,
wherein
the preset address bar operation gesture includes a sliding by two fingers, a pressing and clicking, and a sliding by three fingers,
the sliding by two fingers corresponds to an address bar operation of saving as a bookmark for the address bar,
the pressing and clicking corresponds to an address bar operation of searching,
the sliding by three fingers corresponds to an address bar operation of loading a web page, and
a narrowing gesture corresponds to all the address bar operations.

* * * * *